United States Patent
Jollivet

[11] 3,751,999
[45] Aug. 14, 1973

[54] ARRANGEMENT FOR MOUNTING A PUSH-BUTTON OR THE LIKE ON A CONTROL PANEL

[76] Inventor: Christian L. Jollivet, 57 rue Louise Michel, Levallois, France

[22] Filed: June 2, 1971

[21] Appl. No.: 149,269

[30] Foreign Application Priority Data
June 11, 1970  France .............................. 7021394

[52] U.S. Cl. ................ 74/89.15, 85/32 R, 285/161
[51] Int. Cl. ............................................ F16h 27/02
[58] Field of Search .................. 200/166 M, 172 R, 200/172 A, 168 G, 168 R; 248/27; 285/175, 161; 85/32, 1; 74/89.15

[56] References Cited
UNITED STATES PATENTS

| | | |
|---|---|---|
| 1,370,598 | 3/1921 | Lapointe ............................ 85/32 R |
| 2,199,802 | 5/1940 | Leitz, Jr. et al. ...................... 85/1 R |
| 2,704,426 | 3/1955 | Macaulay ............................. 85/32 R |
| 3,197,241 | 7/1968 | Anton ................................... 285/161 |
| 3,233,299 | 2/1966 | Godel ..................................... 248/27 |
| 3,415,285 | 12/1968 | Torp ..................................... 285/175 |
| 3,585,869 | 6/1971 | Lemor ................................. 74/89.15 |

Primary Examiner—Charles J. Myhre
Assistant Examiner—Wesley S. Ratliff, Jr.
Attorney—William A. Drucker

[57] ABSTRACT

An arrangement for fixing a push-bottom or the like having a cylindrical body in an opening in a panel, the cylindrical body, in use, being connected to a retaining flange intended to cooperate with the front surface of the panel, and a nut threaded onto the cylindrical body for locking the member, via a washer, against the rear surface of the panel, wherein the nut is provided on its periphery with gear teeth which mesh with a pinion fixed to a spindle rotatable in a bearing associated with the washer, means being provided to locate this spindle and rotate it from the rear of the arrangement.

5 Claims, 3 Drawing Figures

Patented Aug. 14, 1973 3,751,999

ARRANGEMENT FOR MOUNTING A PUSH-BUTTON OR THE LIKE ON A CONTROL PANEL

The invention relates to a fixing arrangement enabling a member such as a push button switch, lever switch, or a measuring or signal indicator, to be mounted on a panel, control unit or the like, each of these members being provided with a cylindrical body which is inserted in a circular opening in the panel, and resting on the front surface of the panel via a flange or rim, whilst locking is ensured by a locking element accessible from the rear of the panel.

It is usually desired to arrange the locking element so that the member may be fixed to panels of different thicknesses. In one well known fixing arrangement, a contact box is extended by a cylindrical body which is inserted into the opening in the panel whilst a nut locks the assembly behind the supporting surface. This type of fixing arrangements presents various draw-backs, particularly in connection with a panel having numerous operating and control members. If the locknut is not substantially larger than the contact box or other electrical member, it is necessary to remove this member in order to ensure locking with the aid of a box spanner. If it is desired to use a flat spanner without effecting this removal, a large space is required between the adjacent members. Furthermore, in both cases it is difficult to ensure complete locking without causing the member to turn, unless the latter is provided with a special stop of the key type, which thus necessitates the provision of a corresponding slot in the panel.

Finally, when the member is retained at the front of the panel by a collar, flange or rim made of plastics material as is usual, uncontrolled locking may damage the rim.

The invention overcomes the above-mentioned draw-backs and it makes advantageous improvements to this type of fixing arrangement. It enables locking to be effected from the back of the panel whilst avoiding any damage, due to a tool, of the front surface of the panel, and it achieves, at the same time, balanced locking which, during the locking operation does not exert a torque on the body of the member. The operator may work from behind the panel with a small rod such as a screw-driver, and, for this reason, the members mounted on the panel may be placed practically side-by-side, which decreases the total space required.

Finally as will be seen hereinafter, the arrangement may permit double locking, thereby ensuring that it is vibration-proof. According to the invention there is provided an arrangement for fixing a member having a cylindrical body in a circular opening in a panel, the cylindrical body being connected to a retaining flange against the front surface of the panel, the arrangement comprising, at the rear of the panel, a nut or equivalent threaded member of large diameter screwed on the cylindrical body in a manner to effect locking against the rear surface by means of a washer, the nut being provided on its periphery with gear teeth, whilst the washer is sufficiently thick to comprise a pivot socket for a spindle fixed to a pinion meshing with the teeth of the nut, means being provided to hold the spindle and rotate it from the back of the device.

Advantageously, said means consist simply in providing the body of the member with a lateral lug having a hole in which the spindle is located, the latter having its end remote from the panel provided with a slot for screw-drivers.

According to a feature of the invention, the spindle is made of steel, and the pinion is made of a plastics material, the spindle being threaded and the pinion being screwed on to the latter in such a manner that, when locking the nut against the washer and the rear surface of the panel, the torque exerted on the spindle causes relative displacement between the latter and the pinion. According to another feature of the invention, the socket of the washer consists of cylindrical hole forming a bearing for the end of the spindle, this hole being extended, within the thickness of the washer, by a preferably conical enlargement, whilst the end of the spindle adjacent the rear surface of the panel is provided with a retaining head matching this enlargement, so as to grip a portion of the washer between the said head and an end face of the pinion when the nut is already locked against the washer. The advantage obtained by these two features is that, on the one hand, a torque-limiting device is produced by various simple means, which operates when the nut, the washer and the rear surface of the panel come into contact, and that on the other hand the pinching of the washer between the head of the spindle and end face of the pinion, produces a secondary locking action adding to the general locking action of the member. It will be noted also that a screw-driver acting behind the panel, on a small spindle pivoted to the body of the member cannot cause the member itself to rotate since, due to the gearing, it exerts a force in the reverse direction.

In order that the invention may be more readily understood, one embodiment, applied to the fixing of a push button switch member to a mounting panel, will now be described with reference to the accompanying drawings, in which.

Figure 1:
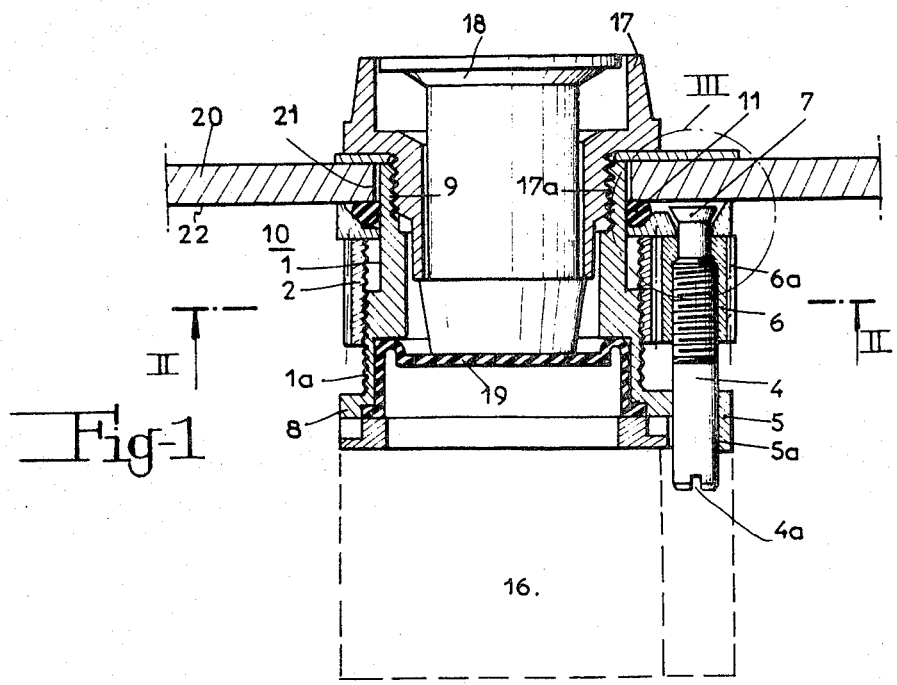
FIG. 1 is an axial section on the line I — I in FIG. 2.
Figure 2:
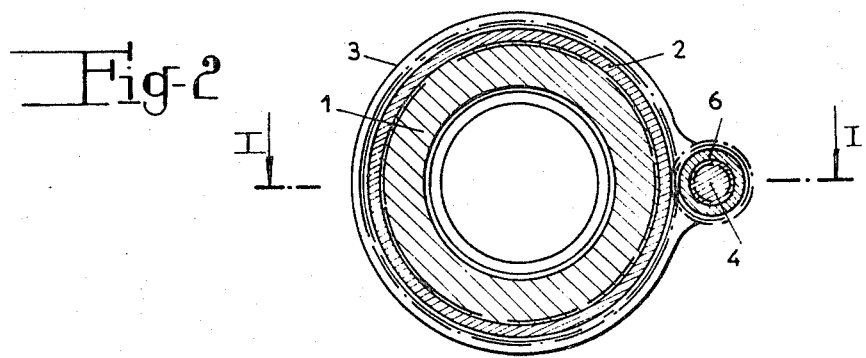
FIG. 2 is a transverse section on the line II — II of FIG. 1.

On a mounting plate or panel 20 is a fixing arrangement, indicated generally at 10, which is used to attach a switch 16 to the panel. The fixing arrangement 10, which is mounted behind the panel 20, also carries a guide 17 of a push button 18, the inner end of which rests against a sealing member 19 extending over operating members (not shown) of the switch 16.

Figure 3:
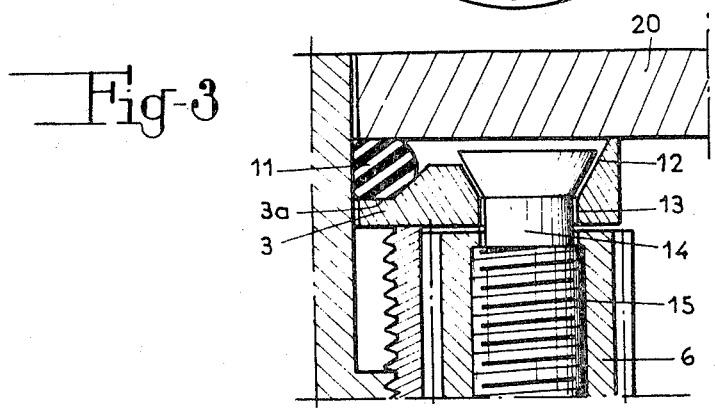
FIG. 3 is an enlarged sectional view of the fragment ringed by the line II in FIG. 1.

The arrangement 10 comprises a cylindrical body having a part engaging within a circular opening 21 in the panel 20. The cylindrical body has an enlarged-diameter, externally threaded part 1a at the rear or inner end of the part. A locking nut 2 is threaded onto the part 1a, and extends over the reduced-diameter part 1. By rotating the nut 2, the latter is axially displaced along the body so as to urge a washer 3 against the rear surface 22 of the panel 20. As shown in FIG. 3, the washer 3 has an annular groove 3a containing an "O" ring 11, so as to apply this ring 11 both against the surface 22 and the cylindrical part 1 of the body. The fixing arrangement 10 comprises, at the end of the threaded part 1a, a base 8 having a shape and fitting, not described in detail, to receive the switch 16.

The base 8 is provided with a lateral lug 5 having a through passage 5a into which a spindle 4 extends. The spindle 4 is threaded at 15 towards its center, the portion 15 terminating in a reduced diameter cylindrical unthreaded portion 15 bearing in a bore 13 in the washer 3. Screwed onto the spindle 4 is a pinion 6, the teeth 6a of which mesh with teeth 2a formed on the periphery of the screw or nut 2. The nut 2 may be made of metal, but is would be more economical to mould it from a plastics material.

The pinion 6 is made from a plastics material, whilst the spindle 4 is simply made from steel.

The spindle 4 is terminated, at its end remote from the panel 20, by a screw-driver slot 4a. At its other end, the spindle 4 has an enlarged retaining head 7 in the shape of a truncated cone which rests in a recess 12 in the washer 3.

The assembly of the device is effected in the following manner: The cylindrical body is fitted with the washer 3, its "O" ring 11, and the nut 2, adjusted to a generally central position, as well as with the spindle 4 engaged in the washer 3 and bearing the pinion 6, and with the switch 16 mounted on the base 8. This entire assembly is offered up to the panel 20, and the cylindrical part 1 inserted into the opening 21.

The flange, collar or rim 17 is then connected to the cylindrical body by screwing the threaded socket 17a of the former into a threaded passage 9 within the body part 1. This assembly of the rim 17 to the cylindrical body is effected by hand, without a key or spanner and without creating any locking stresses.

Then the spindle 4 is rotated from the rear of the device, rotating the pinion 6, and thereby causing the nut 2 to rotate in a reverse direction. As the usual screwing up direction is clockwise, the cooperating threads of the nut 2 and part 1a will be selected that when being locked, the nut 2 is rotated in an anti-clockwise direction, i.e., these threads are left-hand threads. The nut 2 and washer 3 move towards the panel 20 until there is contact, and the ring 11 is compressed. If the operator then continues to turn the spindle 4, the resistance to further rotation of the nut 2, increases to the limit of adherence between the threads 15 and the material of the pinion 6. The system therefore functions as a torque limiter device and may thus prevent total crushing of the "O" ring 11 against the mounting panel 20 as well as preventing damage to the rim 17 and preventing the rim 17 from being pulled through the opening 22. The spindle 4 thus screws slightly into the pinion, and the head 7 begins to be frictionally applied in the dished recess 12 in the washer 3. Moreover, by suitably calculating the conicity of the head 7 and of the dished recess 12, gripping can be obtained in such a manner that the spindle 4 is locked by the pinching effected of the washer 3 against the head 7 and the end face of the pinion 6. It must be noted that, during advance of the nut 2 driving the washer 3 which, in turn draws the spindle 4, the latter moves longitudinally in its guide passage 5a.

The invention is not limited to the shape of the member which has been described, but can be applied to any other assembly produced in a similar manner. It may be applied equally to electric members as well as to pneumatic or hydraulic operating members. The invention may also be applied to signalling indicators or cylindrical measuring equipment fixed in control panels.

What I claim is:

1. An arrangement for fixing a member having a cylindrical body in an opening in a panel or the like, the cylindrical body, in use, being connected to a retaining flange intended to cooperate with the front surface of the panel, and a nut threaded onto the cylindrical body for locking the member, via a washer, against the rear surface of the panel, wherein the nut is provided on its periphery with gear teeth which mesh with a pinion fixed to a spindle rotatable in a bearing associated with the washer, means being provided to locate this spindle and rotate it from the rear of the arrangement and in which the pinion is formed from plastics material while the spindle is formed from steel and has a screw thread on which the pinion is screwed in such a manner that, if a resistance is applied to the pinion, the torque exerted on the spindle will cause relative displacement between the latter and the pinion.

2. An arrangement for fixing a member having a cylindrical body in an opening in a panel or the like, the cylindrical body, in use, being connected to a retaining flange intended to cooperate with the front surface of the panel, and a nut threaded onto the cylindrical body for locking the member, via a washer, against the rear surface of the panel, wherein the nut is provided on its periphery with gear teeth which mesh with a pinion fixed to a spindle rotatable in a bearing associated with the washer, means being provided to locate this spindle and rotate it from the rear of the arrangement and wherein the spindle is provided, at its end engaging the washer, with an enlarged retaining portion, the bearing having a corresponding recess and the enlarged retaining portion is a truncated cone, whilst the bearing in the washer comprises a short cylindrical passage communicating with a conical enlarged passage directed away from the pinion, whereby, in operation, pinching of the washer between the retaining portion and an end face of the pinion occurs when the locking action of the arrangement is completed.

3. Device for fixing through the opening in a wall a hand controlled or signalling apparatus comprising a cylindrical body having a fixed plate and a detachable washer or collar, these two parts having transverse dimensions greater than the diameter of the cylindrical part, the said cylindrical part being placed in the opening of the said wall, and having a thread on which is arranged a nut whose periphery is provided with teeth engaging with the teeth of a pinion mounted on a spindle pivoted permanently on the base plate.

4. Device for fixing through the opening in a wall, a hand controlled or signalling apparatus comprising a cylindrical part having a fixed base plate and a detachable collar or washer, these two parts having transverse dimensions greater than the diameter of the cylindrical body, the said cylindrical body being placed in the opening of the said wall and having a thread on which is arranged a nut whose periphery is provided with teeth engaging with the teeth of a pinion mounted on a spindle, one extremity of which pivots permanently in a washer placed between the nut and the wall, and whose other extremity pivots permanently through a lateral tab of the baseplate and has means of causing it to rotate from the side of the device opposite the detachable collar or washer.

5. Device according to claim 4 in which the extremity of the spindle pivoting in the washer or collar has a widened portion which makes these parts axially joined to form one part, in which the means for rotating said spindle includes a screwdriver slot, and in which the spindle can move axially through the baseplate tab.

* * * * *